United States Patent [19]

Young

[11] Patent Number: 5,613,580

[45] Date of Patent: Mar. 25, 1997

[54] ADJUSTABLE, LOCKABLE STRUT

[75] Inventor: Robert A. Young, Erie, Pa.

[73] Assignee: Lord Corporation, Erie, Pa.

[21] Appl. No.: 630,415

[22] Filed: Apr. 2, 1996

Related U.S. Application Data

[62] Division of Ser. No. 489,012, Jun. 8, 1995, Pat. No. 5,535,861.

[51] Int. Cl.$^6$ ............................................. F16F 9/32
[52] U.S. Cl. ............................................. 188/300; 267/202
[58] Field of Search ................................. 267/202, 203, 267/201, 196; 188/300; 248/188.5, 157, 176.2, 669, 670, 561

[56] References Cited

U.S. PATENT DOCUMENTS

| | | | |
|---|---|---|---|
| 2,042,443 | 5/1936 | Buckstone | 248/161 |
| 2,630,887 | 3/1953 | Paquin | 188/96 |
| 2,644,504 | 7/1953 | Vick | 155/5.24 |
| 2,752,149 | 6/1956 | Forcellini | 267/202 |
| 3,195,848 | 7/1965 | Miller et al. | 248/411 |
| 3,741,514 | 6/1973 | Snurr | 248/412 |
| 3,758,063 | 9/1973 | Lacey | 248/161 |
| 3,828,651 | 8/1974 | Dorner et al. | 91/416 |
| 3,860,250 | 6/1976 | Wiater | 188/281 |
| 3,861,815 | 1/1975 | Landaeus | 403/370 |
| 3,866,964 | 2/1975 | Prater | 294/8.6 |
| 3,885,764 | 5/1975 | Pabreza | 248/162 |
| 4,023,649 | 5/1977 | Wood | 187/8.49 |
| 4,113,222 | 9/1978 | Frinzel | 248/412 |
| 4,180,346 | 12/1979 | Blake | 403/109 |
| 4,627,591 | 12/1986 | Heckmann | 248/411 |
| 4,691,890 | 9/1987 | Han | 248/412 |
| 4,706,916 | 11/1987 | Cullmann et al. | 248/168 |
| 4,892,279 | 1/1990 | Lafferty et al. | 248/125 |
| 4,997,171 | 3/1991 | Toms, Jr. | 267/294 |
| 5,211,379 | 5/1993 | Porter | 267/221 |
| 5,257,680 | 11/1993 | Corcoran et al. | 188/129 |

FOREIGN PATENT DOCUMENTS 8403742  9/1984  WIPO ..................... 188/300

*Primary Examiner*—Robert J. Oberleitner
*Assistant Examiner*—C. T. Bartz
*Attorney, Agent, or Firm*—Richard K. Thomson; Randall S. Wayland; James W. Wright

[57] ABSTRACT

A plurality of embodiments of dual-rate linear dampers which can be utilized as hold open rods. These dampers provide significantly greater resistance to movement in one direction than in the other and, in the claimed embodiment, effectively lock in the hold open position unless and until the design breakover force is incurred. A second spring causes axial compression and, hence, radial bulging, of a first spring causing a inner cylindrical member to be locked in position relative to an outer cylindrical housing. An actuator includes a first rod that extends through the inner cylindrical member, and a second rod portion that is biased by a third spring to a non-engaging position relative to the first rod. A laterally extending lever can be manually engaged to overcome the bias of the second and third springs to unload the first spring significantly reducing the resistance force enabling the relative positions of the inner and outer cylindrical members to be adjusted.

6 Claims, 2 Drawing Sheets

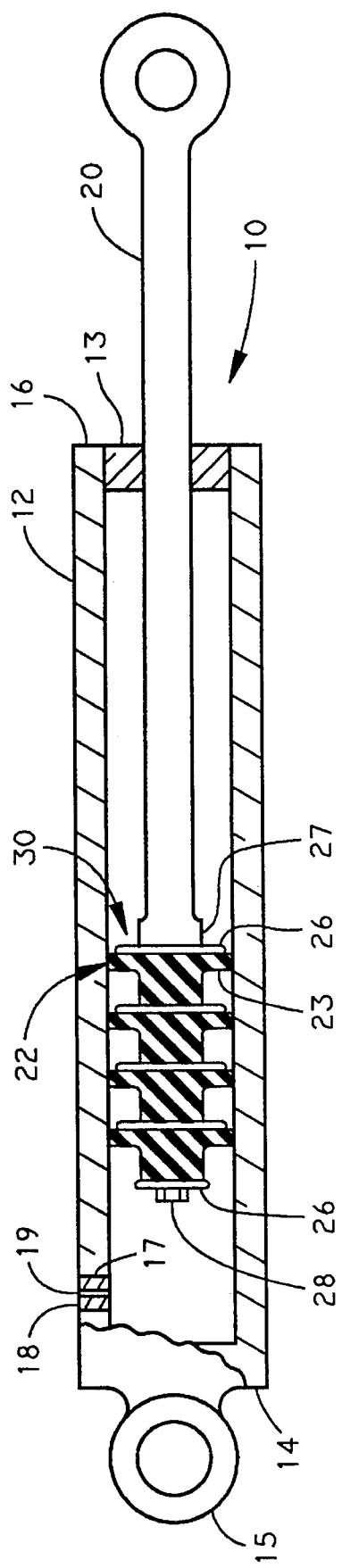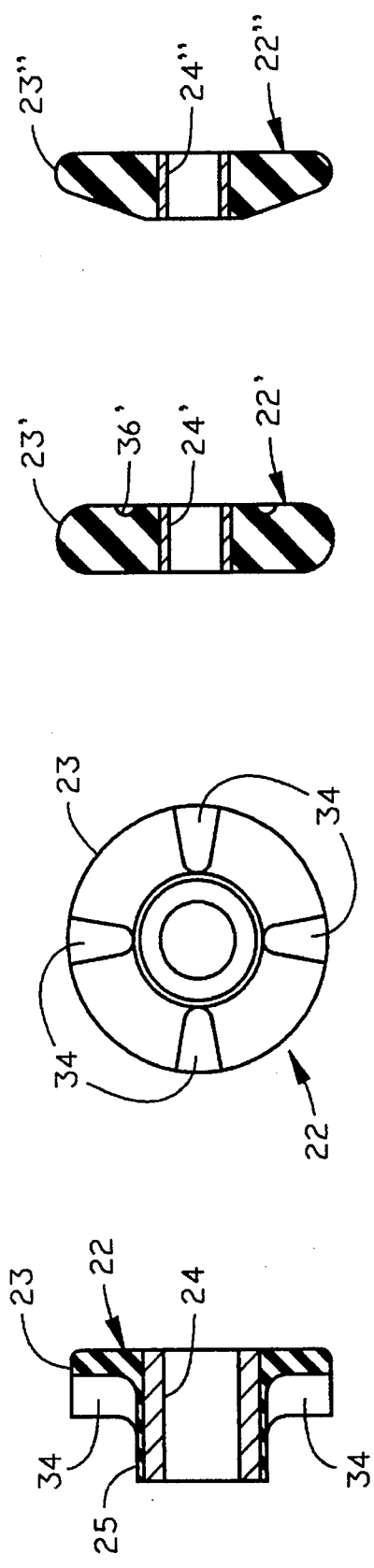

ADJUSTABLE, LOCKABLE STRUT

BACKGROUND AND SUMMARY OF THE INVENTION

The present application is a divisional application of copending U.S. Ser. No. 08/489,012 filed Jun. 8, 1995 entitled "Dual-Rate Linear Damper". This invention is directed to a strut that provides a significant increase in damping to effectively lock the position of the piston rod in position relative to the housing until a particular breakover force is incurred.

This aspect of the invention is related to the adjustable, lockable devices described and claimed in commonly assigned U.S. patent application Ser. No. 08/424,925 filed Apr. 19, 1995, which application is hereby incorporated by reference.

As noted in the earlier application, a number of applications require a suitable alternative to gas springs which can provide a first damping force in a first linear direction and a significantly greater resistance to movement in the other linear direction. Certain of these applications require the capability to effectively lock the piston relative to the housing until a particular predetermined breakover force is incurred.

Some of these applications include a hold-open rod for clam-shell halves of an engine cowling; the retainer for the door on the overhead luggage compartment in an aircraft cabin; the door covering an aircraft fueling port. While either the resisting or locking embodiments could be used on any of these or other applications, only the fuel door application actually requires the features of the lockable embodiment.

The dual-rate linear damper of the present invention employs a plurality of elastomeric disks mounted on a piston rod, each disk having a backing plate in the form of a metal washer. Preferably, each elastomeric disk has a plurality of relief grooves cut in at least one of its faces to facilitate collapse. In a first, typically expanding direction, the elastomeric disks will fold away from the backing disks and provide only minimal resistance to movement while in the second, typically collapsing direction, the backing plate will reinforce the elastomer and effectively result in bulging of the elastomer into the internal surface of the piston housing. This produces a force resisting movement which is between about five and ten times the resistance to movement in the first direction.

The second embodiment provides a locking mechanism for holding the respective door in the open position unless and until a particular breakover force is incurred to prevent damage to the door. That mechanism includes a first elastomeric spring which bulges laterally outwardly under the influence of a second spring. This embodiment utilizes an actuator mechanism which includes a first actuator rod which extends through the first and second springs; a second short rod portion that is biased by a third spring in a direction away from the first actuator rod; and a manually-operable, a laterally extending lever which enables said biasing of said third spring to be overcome, said second rod portion to be brought into engagement with an end of said rod and said rod to be displaced against the biasing force of said second spring to unload said first spring resulting in said resistance force being significantly reduced, whereby said inner cylindrical member can be moved relative to said outer cylindrical member.

Various features, advantages and characteristics of the present invention will become apparent after a reading of the following detailed description of the preferred embodiments.

BRIEF DESCRIPTION OF THE DRAWINGS

The following drawings taken in conjunction with the detailed description, describe several preferred embodiments of the present invention. In the drawings, like reference numerals indicate like features and, FIG. 1 is a side elevation in partial section of a first embodiment of the damper of the present invention;

FIG. 2a is a cross-sectional side view of a first embodiment of elastomeric disk useful in the damper of the present invention;

FIG. 2b is an end view of the disk shown in FIG. 2a;

FIG. 2c is a cross-sectional side view of a second embodiment of disk useful in the damper of the present invention;

FIG. 2d is a cross-sectional side view of a third disk embodiment;

DETAILED DESCRIPTION OF THE PREFERRED EMBODIMENTS

Figure 3:
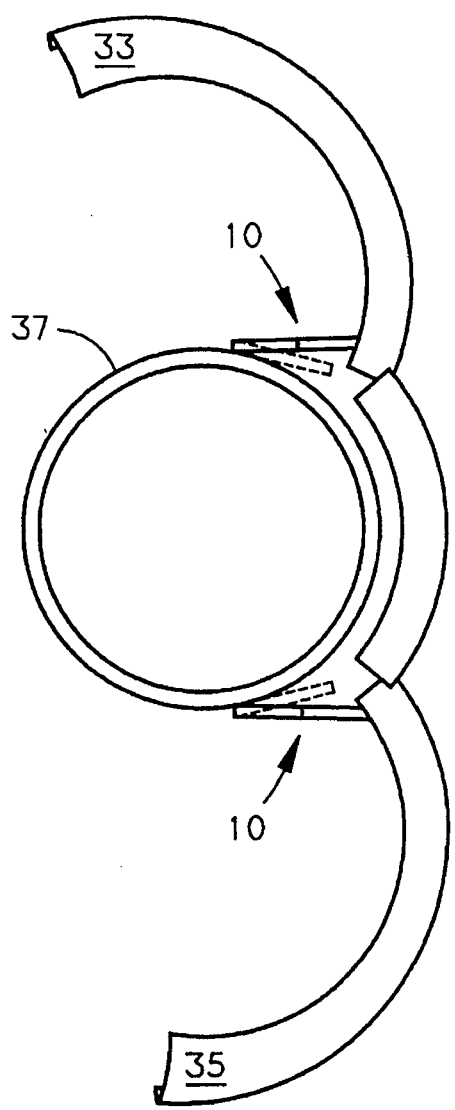
FIG. 3 is an end view of an engine with cowling halves which are held open by the damper of the present invention.

A first embodiment of the dual-rate linear damper of the present invention is depicted in FIG. 1 generally at 10. Damper 10 includes housing 12 and piston rod 20. Housing 12 has a first closed end 14 and an open end 16. A washer 13 which is preferably made of Teflon® polymer, or the like, is positioned in the open end and secured by any conventional manner such as staking, adhesive or a cap member (not shown) could be threaded over the end. Closed end 14 has an attachment eyelet 15 formed thereon and an orifice 17 is provided to permit the air to escape from housing 12 as the piston rod 20 moves in the contracting direction. An adjustable valve element 18 can be provided in order to add air damping to the damping level provided by elastomeric disks 22. Valve element 18 may have one or more slots 19 which taper in order vary the air flow rate permitted into and out of the housing 12.

Piston rod 20 has a plurality of elastomeric disks 22 which are attached thereto in a manner to maintain a spaced relationship. The embodiment depicted in FIG. 1 has four disks 22. It will be appreciated that it is within the scope of the invention to have a plurality of two or more, and more preferably, three or more, disks 22. In this embodiment of disk 22, shown in more detail in FIGS. 2a and 2b, each disk includes a cylindrical metal sleeve 24 coated on its external surface by an elastomeric layer 25. A first end of sleeve 24 engages a backing plate 26, which takes the form of a metal washer, while the opposite end engages the back side of another washer 26. First washer 26 engages a shoulder 27 on piston rod 20 and the last washer 26 is held in place by bolt 28 which is threaded into the end of piston rod 20. Hence, there is metal-to-metal contact throughout the length of the piston head 30 and laterally extending flanges 23 of the series of washers will remain in fixed relative position.

It is an important aspect of the present invention that piston head 30 offer significantly greater damping (i.e., develop a larger resisting force to movement) in one direction than in the other, namely, for the applications envisioned, that the resistance to contracting or collapsing be between five and ten times the resistance to expanding. More particularly, the damping force is preferably about seven times greater in one direction than the other. Some applications which can be envisioned (i.e., some gas spring replacement uses), will require that the disks 22 and backing washer 26 be reversed to implement a greater expanding force than contracting force.

The use of backing washers 26 will necessarily stiffen the elastomer of flange 23 when moving in a direction away from the backing plate. Other steps may be taken to weaken the resistance to movement in the opposing direction. In the first disk embodiment of FIGS. 2*a* and 2*b*, the under surface of the flange 23 has elastomer removed as indicated by notches 34. This facilitates the flexing of flanges 23 away from backing plates 26 significantly reducing the force exerted against the inner surface of cylinder 12. While these notches are shown extending only partially through the flange 23, for greater flexibility (and ease of manufacture) notches 34 may extend completely through the flange, at some cost to the integrity of the part. The desired flexibility can be varied by varying the thickness of flange 23, the depth and width of notches 34, and the hardness of the elastomer. The diameter of flange 23 is preferably greater than the inside diameter of housing 12 so as to produce between ten and twenty percent precompression of the elastomer when inserted in the housing and, more preferably, about fifteen percent precompression.

FIG. 2*c* shows a second embodiment of elastomeric disk 22'. In this and in the FIG. 2*d* embodiment, the spacer function is provided by a separate sleeve element. The integral sleeve configuration is preferred and it will be appreciated the features of these latter two embodiments can be implemented with an integral sleeve as well. In the FIG. 2*c* embodiment, the flexibility is provided by an annular ring 36' on either or both faces of disk flange 23'. By varying the number, diameter and surface of the annular ring(s) 36', the flexibility of the disk 22' can be controlled to provide the desired difference in force generated in the two opposing directions.

In the FIG. 2*d* embodiment, flexibility of disk 22" is provided by tapering flange 23". While the tapering surface could conceivably be positioned to face in either direction, it is preferred that the taper face in the direction of the contracting movement (toward the sleeve). Positioning the taper to face in the opposite direction will introduce an amount of lost motion in which flange 23" will be permitted to flex during relative motion between housing 12 and piston rod 20 without any movement between the outer edge of disk 22" and the inner surface of the housing. In some applications, such a lost motion could be desirable, in which case the reversal of disk 22" could be utilized.

FIG. 3 depicts an exemplary application of the damper 10 of the present invention. An aircraft engine cowling is shown with upper half 33 and lower half 35 depicted in their deployed positions permitting servicing of the engine. Normally, two dampers 10 (one shown) will be employed on each cowling half adjacent each end and each will react between its respective cowling half and support 37. Larger cowlings could employ a larger number of dampers 10 or they could simply be made larger to handle the extra weight. Dampers 10 are shown, generally, in their closed positions by dotted lines. When cowling halves 33 and 35 are closed, they will be held in place by fastening their contacting edges together by screws, or the like (not shown). Dampers 10 will open easily because of the low damping force created in the extending direction, and then the larger resistance to contracting force will hold the cowling open until the mechanic desires to shut them. Other applications such as the overhead compartment hold open rods in aircraft cabins would function similarly.

Figure 4:
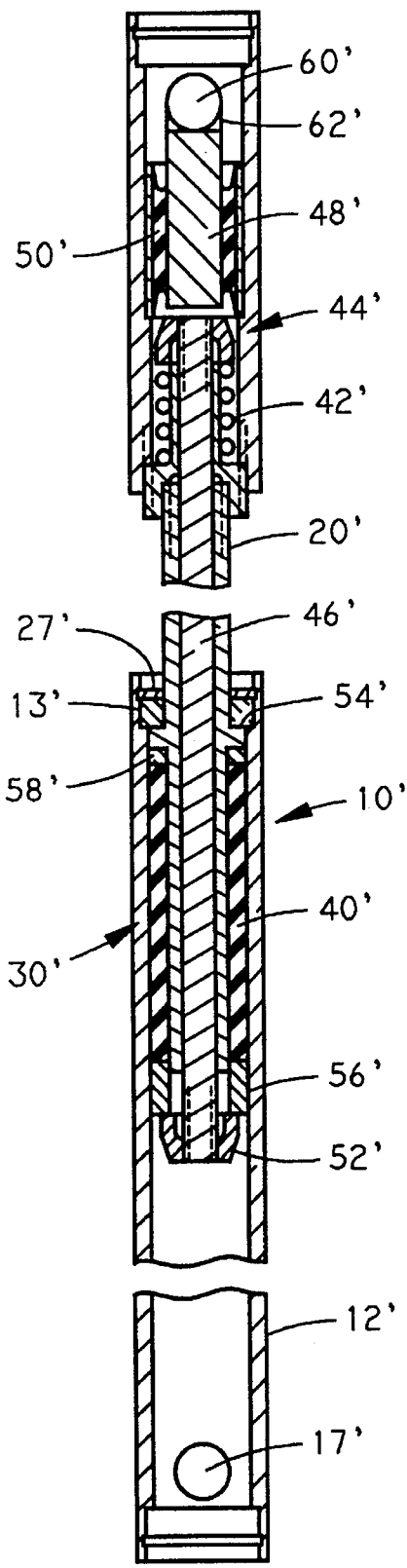
FIG. 4 is a cross-sectional side view of a second embodiment of the present invention which includes a locking feature.

For certain applications, it is desired to effectively lock the element in place, such as, for example, in the case of a hold open rod for a aircraft door on a fuel port. The embodiment depicted in FIG. 4 has such a capability. As described in copending U.S. application Ser. No. 08/424, 925, hold open rod 10' has a piston rod 20' with a piston head 30' which includes an elastomeric spring or sleeve 40'. By axially collapsing sleeve 40' under influence of second spring 42', sleeve 40' bulges radially and effectively locks piston rod 20' in position relative to housing 12'. Sleeve 40' can be designed to retain this relative position until a predetermined breakover force causes motion. The designing in such a breakover force prevents damage to the retained member when it incurs a force greater than the breakover force.

Actuator mechanism 44' includes a first actuator rod 46' extending through first and second springs 40' and 42'. A second short actuator rod segment 48' is biased away from said first rod 46' by a third spring 50', depicted here as (and preferably being) an elastomeric spring. Second spring 42' causes element 52' to axially compress sleeve 40' against flange 54' (through intermediate metallic sleeve 56' and washer 58', respectively) causing the radial bulging which effectively locks piston 20' in place. Once refueling is complete, a manually operative lever 60' which extends transverse to rod segment 48', can be engaged, and while translating in slot 62', made to overcome the bias of third spring 50' such that rod segment 48' engages rod 46', and further translation causes rod 46' to overcome the biasing force of second spring 42' and unloads first spring 40' such that the bulging of the locking device is abated and piston 20' can move within housing 12'. Orifice 17' is provided in the lower portion of housing 12' to permit the escape of entrapped air. As with the previous embodiment, an adjustable valve may be provided if desired to provide a desired level of air damping as a supplement to that of sleeve 40'. Slide bearing 13' for piston rod 20' is held in position by circlip 27'. The ends of housing 12' are closed by end caps received in complementary shaped openings and a similar end cap could replace bearing 13' and circlip 27'.

Disclosed herein are a plurality of embodiments of dual-rate linear dampers which can be utilized as hold open rods. These dampers provide significantly greater resistance to movement in one direction than in the other and, in one embodiment, effectively lock in the hold open position unless and until the design breakover force is incurred. The comparative resistance to movement in the two linear directions can be altered within the range of between five and ten times the force in the resistive embodiment by varying a number of parameters including, but not limited to, the number of disks in the string, the thickness of the disk flange, the number and depth of grooves in one or both surfaces of the flange, the tapering of the flange, and the properties of the elastomer.

Various changes, alternatives and modifications will become apparent to one of ordinary skill in the art following a reading of the foregoing specification. For example, load spring 42' could obviously be positioned on the other end of first rod 46' without affecting the operation of the device. It is intended that all such changes, alternatives and modifications as come within the scope of the appended claims be considered part of the present invention.

What is claimed is:

1. An adjustable, lockable strut including an outer cylindrical member having an inner periphery, an inner cylindrical member having an outer periphery, locking means including a first spring member surrounding at least a portion of said outer periphery of said inner cylindrical member and engaging at least a portion of said inner periphery of said outer cylindrical member, a second spring member axially, compressively loading said first spring member and causing it to undergo radial bulging thereby increasing a resistance force exerted by said first spring member to movement between said inner and outer cylindrical members, an actuator moving said second spring member from a first bulge-producing position to a second inoperative position where said resistance force is significantly reduced, the improvement comprising said actuator including
 a) a first rod extending through said first and second springs;
 b) a shorter second rod portion coaxial with and positioned adjacent a first end portion of said first rod;
 c) a third spring biasing said second rod portion into a first non-engaging position with respect to said first rod;
 d) a manually-operable, laterally extending lever which enables said biasing of said third spring to be overcome, said second rod portion to be brought into engagement with said first end of said first rod and said first rod to be displaced against the biasing force of said second spring to unload said first spring resulting in said resistance force being significantly reduced whereby said inner cylindrical member can be moved relative to said outer cylindrical member.

2. The adjustable, lockable strut of claim 1 wherein said third spring comprises an elastomeric spring.

3. An adjustable, lockable strut comprising
 a) an outer cylindrical member having an inner periphery;
 b) an inner cylindrical member having an outer periphery;
 c) locking means including
  i) a first spring member surrounding at least a portion of said outer periphery of said inner cylindrical member and engaging at least a portion of said inner periphery of said outer cylindrical member;
  ii) a second spring member compressively loading said first spring member in an axial direction causing it to undergo radial bulging to thereby increase a resistance force exerted by said first spring member to movement between said inner and outer cylindrical members;
  iii) an actuator moving said second spring member from a first bulge-producing position to a second inoperative position where said resistance force is significantly reduced, said actuator including
   a) a first rod extending through a center portion of said inner cylindrical member;
   b) a second rod portion that is shorter than said first rod and coaxial therewith positioned adjacent a first end of said first rod;
   g) a third spring biasing said second rod portion into a first non-engaging position with respect to said first rod;
   d) an engagable lever which enables said biasing of said third spring to be overcome, said second rod portion to be brought into engagement with said first end of said first rod and said first rod to be displaced against the biasing force of said second spring to unload said first spring resulting in said resistance force being significantly reduced, whereby said inner cylindrical member can be moved relative to said outer cylindrical member.

4. The adjustable, lockable strut of claim 3 wherein said third spring comprises an elastomeric spring.

5. The adjustable, lockable strut of claim 3 wherein said outer cylindrical member is made up of two separate, spaced elements.

6. The adjustable, lockable strut of claim 3 wherein said engagable lever extends laterally with respect to the outer cylindrical member.

\* \* \* \* \*